US012615015B2

(12) United States Patent
Zhang et al.

(10) Patent No.: US 12,615,015 B2
(45) Date of Patent: Apr. 28, 2026

(54) HIL TESTING PLATFORM FOR PHOTOVOLTAIC POWER PLANT, AND PPC PERFORMANCE TESTING METHOD

(71) Applicant: Sungrow Power Supply Co., Ltd., Hefei (CN)

(72) Inventors: Yuanze Zhang, Hefei (CN); Tao Jiang, Hefei (CN); Zijian Da, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 450 days.

(21) Appl. No.: 18/134,749

(22) Filed: Apr. 14, 2023

(65) Prior Publication Data

US 2023/0336122 A1 Oct. 19, 2023

(30) Foreign Application Priority Data

Apr. 18, 2022 (CN) .......................... 202210403201.0

(51) Int. Cl.
*H02S 50/10* (2014.01)

(52) U.S. Cl.
CPC .................................... *H02S 50/10* (2014.12)

(58) Field of Classification Search
CPC ......... H02S 50/10; H02S 50/00; Y02E 10/56; G05B 23/0243; G05B 2219/24065; H02J 3/381; H02J 3/48; H02J 3/50; H02J 13/00002; H02J 13/00016; H02J 13/00028; H02J 13/00034; H02J 2203/20; H02J 2300/24
See application file for complete search history.

(56) References Cited

U.S. PATENT DOCUMENTS

2015/0188401 A1 7/2015 Zheng et al.
2019/0116245 A1* 4/2019 Hong ................ H02J 13/00034

FOREIGN PATENT DOCUMENTS

| CN | 105182796 | A | | 12/2015 | |
| CN | 105514973 | A | * | 4/2016 | ........... G06F 30/367 |
| CN | 106803671 | A | | 6/2017 | |
| CN | 107102568 | A | | 8/2017 | |
| CN | 107689642 | A | | 2/2018 | |

(Continued)

OTHER PUBLICATIONS

Machine translation of CN107689642A (Year: 2018).*

(Continued)

*Primary Examiner* — Lee E Rodak
*Assistant Examiner* — Sangkyung Lee
(74) *Attorney, Agent, or Firm* — Wolf, Greenfield & Sacks, P.C.

(57) ABSTRACT

A HiL testing platform for a photovoltaic power station and a PPC performance testing method are provided. The HiL testing platform includes: a PPC, an inverter controller, and a HiL real-time simulator. Each of the PPC, the inverter controller, and the HiL real-time simulator is arranged with an upper computer. The PPC is configured to communicate with the inverter controller according to a predetermined communication protocol. The HiL real-time simulator is connected to the PPC and the inverter controller through a digital input interface and/or an analog output interface, and is configured to simulate a testing device in the photovoltaic power station in a digital model form.

12 Claims, 5 Drawing Sheets

(56)             References Cited

FOREIGN PATENT DOCUMENTS

| | | | | | |
|---|---|---|---|---|---|
| CN | 108233356 | A | 6/2018 | | |
| CN | 108764645 | A | 11/2018 | | |
| CN | 109782732 | A | 5/2019 | | |
| CN | 109783900 | A | 5/2019 | | |
| CN | 112015162 | A | 12/2020 | | |
| CN | 112684719 | A | 4/2021 | | |
| CN | 106546844 | B | 6/2021 | | |
| KR | 20100064508 | A | * 6/2010 | ............... | H02J 3/34 |
| KR | 20190033323 | A | 3/2019 | | |

OTHER PUBLICATIONS

Machine translation of CN108233356A (Year: 2018).*
Machine translation of CN109783900A (Year: 2019).*
Machine translation of KR20100064508A (Year: 2010).*
Machine translation of CN105514973A (Year: 2016).*
First Examination Report for Australian Patent Application No. 2023202335, dated Jan. 30, 2024.
First Office Action for Chinese Application No. 202210403201.0, dated Feb. 28, 2025.
Second Office Action issued Jul. 29, 2025 for Chinese Application No. 202210403201.0.
Zhang et al., Design and Implementation of the Semi-physical Simulation for High-power Grid-connected Inverter. Power Electronics. Sep. 2018;52(9):104-111.

* cited by examiner

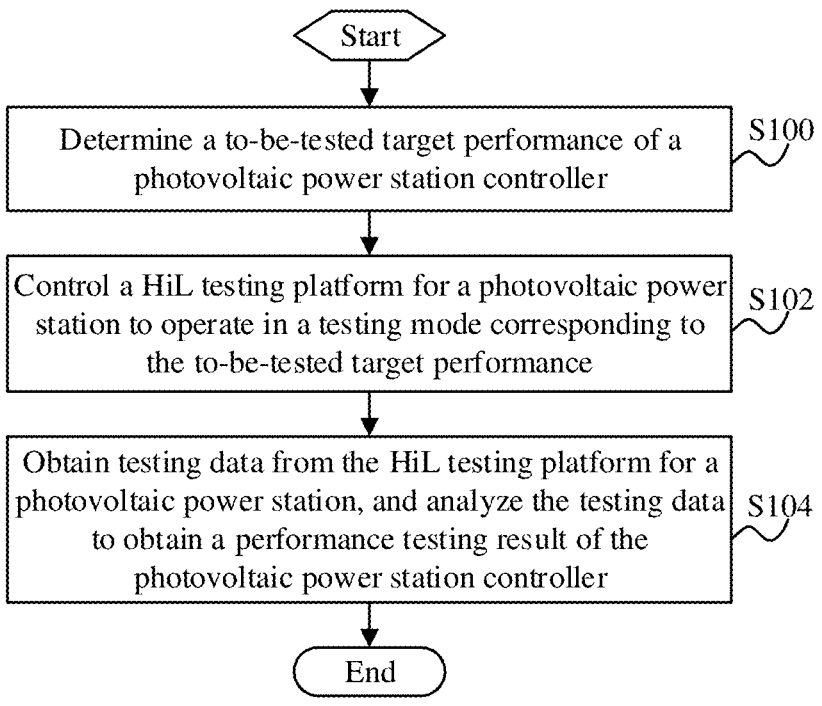

Start

Determine a to-be-tested target performance of a photovoltaic power station controller     S100

Control a HiL testing platform for a photovoltaic power station to operate in a testing mode corresponding to the to-be-tested target performance     S102

Obtain testing data from the HiL testing platform for a photovoltaic power station, and analyze the testing data to obtain a performance testing result of the photovoltaic power station controller     S104

End

Figure 2

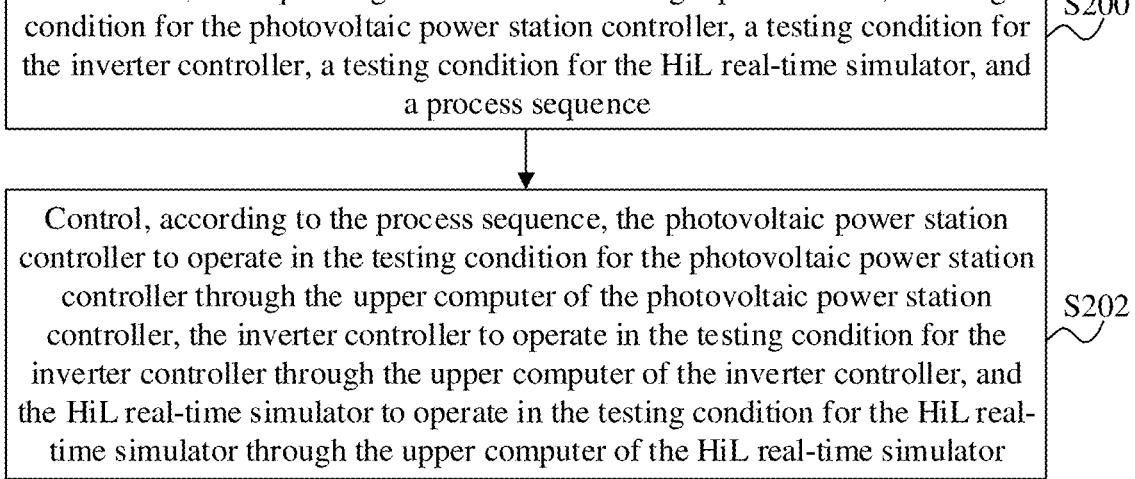

Determine, corresponding to the to-be-tested target performance, a testing condition for the photovoltaic power station controller, a testing condition for the inverter controller, a testing condition for the HiL real-time simulator, and a process sequence     S200

Control, according to the process sequence, the photovoltaic power station controller to operate in the testing condition for the photovoltaic power station controller through the upper computer of the photovoltaic power station controller, the inverter controller to operate in the testing condition for the inverter controller through the upper computer of the inverter controller, and the HiL real-time simulator to operate in the testing condition for the HiL real-time simulator through the upper computer of the HiL real-time simulator     S202

Figure 3

HIL TESTING PLATFORM FOR PHOTOVOLTAIC POWER PLANT, AND PPC PERFORMANCE TESTING METHOD

The present disclosure claims priority to Chinese Patent Application No. 202210403201.0, titled "HIL TESTING PLATFORM FOR PHOTOVOLTAIC POWER PLANT, AND PPC PERFORMANCE TESTING METHOD", filed on Apr. 18, 2022, with the China National Intellectual Property Administration, which is incorporated herein by reference in its entirety.

FIELD

The present disclosure relates to the field of test technology, and in particular to a HiL testing platform for a photovoltaic power plant power plant and a PPC performance testing method.

BACKGROUND

The photovoltaic power plant controller (PPC) is a device used to control operation of a photovoltaic power plant to ensure operation parameters of the power plant at a point of connection (PoC) meeting requirements for power grid connection. The PPC controls active powers, reactive powers, voltages, frequencies, power ramp rates and the like at the PoC, achieving maximum benefits of the photovoltaic power plant and enhancing the stability of the power grid. Specifically, the PPC collects voltage information and current information at the points of connection by using sensors, performs communication with an inverter of the photovoltaic power plant to exchange information, and controls a power output of the inverter through active/reactive power scheduling instructions.

The control logics and performance of the PPC and the information interaction between the PPC and the inverter of the photovoltaic power plant directly affect the stability and safety of the system including the photovoltaic inverter, the power plant, and the like. Therefore, it is important to test the performance of the PPC.

At present, performance of a PPC is generally tested in a manner of connecting the PPC to a power plant. However, in this manner, the power quality of the power plant may be affected, the safe operation of the power grid may be endangered, and results in the loss of power generation. Moreover, due to the weather condition, the probability of extreme operation conditions is low, and it is difficult to determine the test timing. In addition, for operation conditions such as an extremely weak power grid condition, a continuous voltage condition, and a frequency crossing condition, it is difficult to simulate by using the physical testing platform or high simulation costs are required.

SUMMARY

In view of the above, a HiL testing platform for a photovoltaic power plant, and a PPC performance testing method are provided according to the present disclosure to solve the problems in the conventional solutions such as too many potential risks, difficulties in determining test timing, and difficulties in simulating operation conditions or high simulation costs.

Therefore, the following technical solutions are provided according to the embodiments of the present disclosure.

In a first aspect of the present disclosure, a HiL testing platform for a photovoltaic power plant is provided. The HiL testing platform for a photovoltaic power plant includes: a PPC, an inverter controller and a HiL real-time simulator. Each of the IPPC, the inverter controller, and the HiL real-time simulator is arranged with an upper computer. The PPC is configured to communicate with the inverter controller according to a predetermined communication protocol. The HiL real-time simulator is connected to the PPC and the inverter controller through a digital input interface and/or an analog output interface, and is configured to simulate a testing device in the photovoltaic power plant in a digital model form.

In an embodiment, in the HiL testing platform for a photovoltaic power plant, the testing device simulated by the HiL real-time simulator in the digital model form includes: a photovoltaic PV source, an inverter, a transformer, a transmission line, and a power grid.

In an embodiment, in the HiL testing platform for a photovoltaic power plant, the number of the inverter controller is M. The HiL real-time simulator further includes: a power multiplier module configured to amplify a power of the inverter by N/M times, M represents a positive integer, and N represents the number of the inverter of the photovoltaic power plant.

In an embodiment, in the HiL testing platform for a photovoltaic power plant, the HiL real-time simulator, the PPC and the inverter controller are synchronized.

In an embodiment, in the HiL testing platform for a photovoltaic power plant, the predetermined communication protocol includes any one of an IEC104 protocol, a GOOSE protocol, and a Modbus/TCP protocol.

In an embodiment, in the HiL testing platform for a photovoltaic power plant, the inverter controller includes: an inverter core control module and a communication module.

The inverter core control module is communicatively connected to the communication module through a controller area network (CAN) bus.

In an embodiment, in the HiL testing platform for a photovoltaic power plant, the HiL real-time simulator is connected to the inverter core control module through the digital input interface and the analog output interface.

In an embodiment, in the HiL testing platform for a photovoltaic power plant, the PPC includes: a smart meter, a power plant controller, and a network switch. The network switch is communicatively connected to the smart meter and the power plant controller.

In an embodiment, in the HiL testing platform for a photovoltaic power plant, the HiL real-time simulator is connected to the smart meter through the analog output interface.

In a second aspect of the present disclosure, a PPC performance testing method is provided. The method is applied to the HiL testing platform for a photovoltaic power plant in the first aspect. The method includes: determining a target performance of the PPC to be tested; controlling the HiL testing platform for a photovoltaic power plant to operate in a testing mode corresponding to the target performance to be tested; and obtaining testing data from the HiL testing platform for a photovoltaic power plant, and analyzing the testing data to obtain a performance testing result of the PPC.

In an embodiment, in the PPC performance testing method, the controlling the HiL testing platform for a photovoltaic power plant to operate in a testing mode corresponding to the target performance to be tested includes: determining, for testing the target performance, a testing condition for the PPC, a testing condition for the inverter controller, a testing condition for the HiL real-time simulator, and a process sequence; and controlling, according to the process sequence, the PPC to operate in the testing condition for the PPC through the upper computer of the PPC, the inverter controller to operate in the testing condition for the inverter controller through the upper computer of the inverter controller, and the HiL real-time simulator to operate in the testing condition for the HiL real-time simulator through the upper computer of the HiL real-time simulator.

In an embodiment, in the PPC performance testing method, the target performance includes any one of an active/reactive power scheduling performance, a high/low voltage ride through performance and a frequency response performance.

The HiL testing platform for a photovoltaic power plant according to the present disclosure includes: a PPC, an inverter controller, and a HiL real-time simulator. Each of the PPC, the inverter controller, and the HiL real-time simulator is arranged with an upper computer. The PPC is configured to communicate with the inverter controller according to a predetermined communication protocol. The HiL real-time simulator is connected to the PPC and the inverter controller through a digital input interface and/or an analog output interface, and is configured to simulate a testing device in the photovoltaic power plant in a digital model form. Therefore, with the HiL testing platform for a photovoltaic power plant according to the present disclosure, the flexibility of pure digital simulation and the accuracy of physical testing are considered, various stable/transient operation conditions of a photovoltaic power plant and a power grid can be tested in real-time without connecting to a real photovoltaic power plant and a power grid, solving the problems in the conventional solutions such as too many potential risks, difficulties in determining test timing, and difficulties in simulating operation conditions or high simulation costs.

BRIEF DESCRIPTION OF THE DRAWINGS

In order to more clearly illustrate the technical solutions in the embodiments of the present disclosure or in the conventional technology, the accompanying drawings used in the description of the embodiments or the conventional technology are briefly introduced hereinafter. It is apparent that the drawings in the following description illustrate merely embodiments of the present disclosure. Other drawings may be obtained by those skilled in the art without creative efforts based on the provided drawings.

FIG. 2 is a flow chart of a PPC performance testing method according to an embodiment of the present disclosure;

FIG. 3 is a flow chart of controlling a HiL testing platform for a photovoltaic power plant to operate in a testing mode corresponding to a target performance to be tested according to an embodiment of the present disclosure;

DETAILED DESCRIPTION OF EMBODIMENTS

The technical solutions in the embodiments of the present disclosure will be described clearly and completely hereinafter in combination with the drawings in the embodiments of the present disclosure. It is apparent that the described embodiments are merely a part of the embodiments of the present disclosure, rather than all the embodiments. Based on the embodiments of the present disclosure, all other embodiments obtained by those skilled in the art without creative efforts fall within the protection scope of the present disclosure.

According to an embodiment of the present disclosure, a HiL (hardware-in-the-loop) testing platform for a photovoltaic power plant is provided, to solve the problems in the conventional solutions such as too many potential risks, difficulties in determining test timing, and difficulties in simulating operation conditions or high simulation costs.

Figure 1:
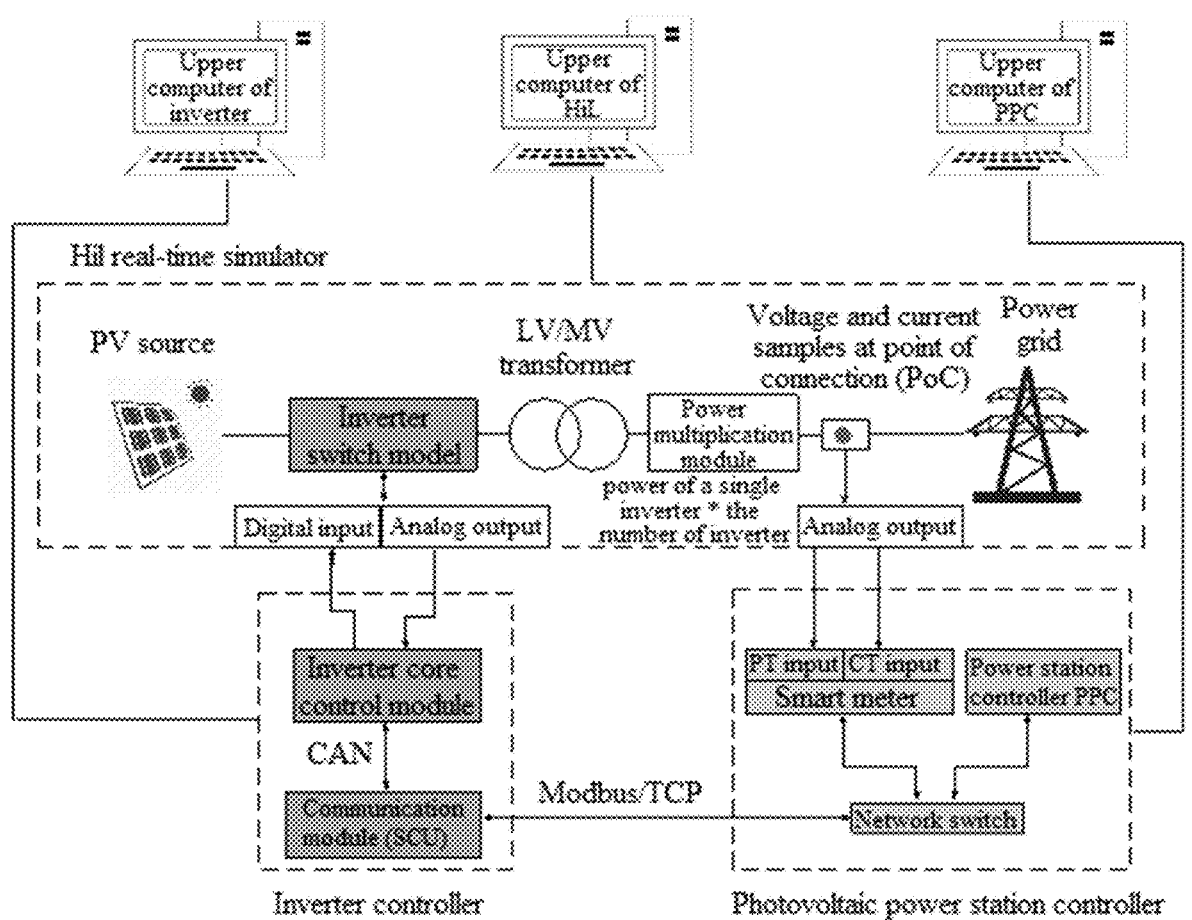
FIG. 1 is a schematic structural diagram of a HiL testing platform for a photovoltaic power plant according to an embodiment of the present disclosure.

Referring to FIG. 1, the HiL testing platform for a photovoltaic power plant includes: a PPC, an inverter controller and a HiL real-time simulator. Each of the PPC, the inverter controller, and the HiL real-time simulator is arranged with an upper computer.

The PPC communicates with the inverter controller according to a predetermined communication protocol.

As shown in FIG. 1, the PPC includes: a smart meter, a power plant controller and a network switch. The network switch is communicatively connected to the smart meter and the power plant controller.

In practical applications, the smart meter is configured to receive voltage data and current data at points of connection from the HiL real-time simulator, and transmit the received data to a core control unit of the inverter controller, that is, the power plant controller. The power plant controller implements a logic operation function of the PPC. As a communication module of the PPC, the network switch is configured to perform information exchange with the inverter controller.

The inverter controller includes: an inverter core control module and a communication module. The inverter core control module and the communication module are communicatively connected through a CAN bus.

In practical applications, the inverter core control module is a core control unit of the inverter controller. The inverter core control module includes a sampling and conditioning circuit. The inverter core control module may obtain a voltage signal or a current signal from the HiL real-time simulator, and may transmit a PWM modulation pulse to the HiL real-time simulator through a the digital input interface of the HiL real-time simulator, thereby performing on-off control on an IGBT switch in an inverter model.

It should be noted that, the communication module in the inverter controller communicates with the network switch in the PPC according to a predetermined communication protocol. The predetermined communication protocol may be an IEC104 (Telecontrol equipment and systems—Part 5-104) protocol, a GOOSE (Generic Object Oriented Substation Event) protocol, or a Modbus/TCP protocol. It is apparent that the predetermined communication protocol may be other conventional communication protocols depending on specific application conditions and user requirements, which is not limited in the present disclosure and is within the protection scope of the present disclosure.

The HiL real-time simulator is connected to the PPC and the inverter controller via a digital input interface and an analog output interface, and simulates a testing device in the photovoltaic power plant in a digital model form.

The HiL real-time simulator includes a central processing unit, a digital input board and an analog output board. Specifically, the digital input interface of the HiL real-time simulator is arranged on the digital input board, and the analog output interface of the HiL real-time simulator is arranged on the analog output board.

In practical applications, the HiL real-time simulator is connected to the inverter core control module of the inverter controller via the digital input interface and the analog output interface, and is connected to the smart meter in the PPC via the analog output interface. Specifically, the analog output interface is connected to a PT input and a CT input of the smart meter.

It should be noted that the HiL real-time simulator may simulate a testing device in a digital model form by using the central processing unit. The testing device simulated by the HiL real-time simulator may include: a photovoltaic (1V) source (the PV source shown in FIG. 1), an inverter (the inverter switch model shown in FIG. 1), a transformer (the LV/MV transformer shown in FIG. 1), and corresponding transmission lines and the power grid. Specifically, the HiL real-time simulator is configured to simulate a power circuit of the inverter. The transformer may be a high-to-medium voltage transformer.

In practical applications, in order to obtain testing data, voltage testing points and current testing points are generally set at a direct current side of the photovoltaic PV source, at an output terminal of the inverter, and at the points of connection.

It should be noted that in order to ensure the accuracy of testing, the HiL real-time simulator, the PPC and the inverter controller in the HiL testing platform for a photovoltaic power plant are synchronized.

It should be further noted that in practical applications, the number of the PPC in the HiL testing platform for a photovoltaic power plant and the number of the inverter controller in the HiL testing platform for a photovoltaic power plant may both be one, and the number of the inverter controller may be greater than one. That is, the PPC is connected to at least one inverter controller.

In practical applications, the upper computer of the HiL real-time simulator is configured to perform system modeling, perform real-time environment parameter configuration, manage instruments, and perform monitoring. The real-time environment parameter configuration is transmitted to the HiL real-time simulator via a communication port, and operation states of models in the HiL real-time simulator are uploaded to the instruments and monitoring modules of the upper computer of the HiL real-time simulator in real time via the communication port.

The upper computer of the inverter controller is configured to configure control parameters, protection parameters, and operation modes and other parameters of the inverter and monitor the operation state of the inverter.

The upper computer of the PPC is configured to configure operation parameters, control modes, power scheduling instructions to be transmitted by the PPC, and monitor data, such as an active power, a reactive power, a voltage, a current, a power quality during the HiL real-time simulator operating, sampled by the PPC at points of connection.

Based on the above principle, the HiL testing platform for a photovoltaic power plant according to the embodiment includes: a PPC, an inverter controller, and a HiL real-time simulator. Each of the PPC, the inverter controller, and the HiL real-time simulator is arranged with an upper computer. The PPC is configured to communicate with the inverter controller according to a predetermined communication protocol. The HiL real-time simulator is connected to the PPC and the inverter controller through a digital input interface and/or an analog output interface, and is configured to simulate a testing device in the photovoltaic power plant in a digital model form. Therefore, with the HiL testing platform for a photovoltaic power plant according to the present disclosure, the flexibility of pure digital simulation and the accuracy of physical testing are considered, various stable/transient operation conditions of a photovoltaic power plant and a power grid can be tested in real-time without connecting to a real photovoltaic power plant and a power grid, solving the problems in the conventional solutions such as too many potential risks, difficulties in determining test timing, and difficulties in simulating operation conditions or high simulation costs.

It should be noted that according to the conventional technology, the performance of the PPC may be tested by using a pure digital simulation testing platform. Although the testing cost of the pure digital simulation test is low and risk-free, the simulation environment cannot truly reflect the real performance of the PPC, resulting in low testing accuracy and poor reference of the test results. According to the present disclosure, the PPC and the inverter controller are physical products, and the performances of the PPC and the inverter controller are consistent with the actual products, so that the test results obtained by the HiL testing platform of the photovoltaic power plant are reliable and reflect the operation features of the actual photovoltaic power plant.

In an embodiment, in another embodiment according to the present disclosure as shown in FIG. 1, in a case that the number of the inverter is M (where M is equal to one in FIG. 1), the HiL real-time simulator further includes: a power multiplication module. The power multiplication module is configured to amplify a power the inverter by N/M times, where M is a positive integer, and N represents the number of the actual inverter of the photovoltaic power plant.

In practical applications, since the PPC receives the voltage data and the current data of the photovoltaic power plant at the point of connection in testing the performance of the PPC, it is required for the HiL real-time simulator to simulate other testing devices required in the photovoltaic power plant. In a case that the number of the inverters simulated by the HiL real-time simulator is equal to M, the HiL real-time simulator further includes: a power multiplication module. The power multiplication module is configured to amplify the power of the inverter by N/M times, where N represents the number of the actual inverter of the photovoltaic power plant. Thus, the voltage data and the current data received by the PPC are the data of the photovoltaic power plant at the point of connection.

In the embodiment, the power multiplication module is arranged in the HiL real-time simulator, so that the powers of the inverters of the entire photovoltaic power plant can be simulated by only simulating a single inverter, reducing the number of the inverter of the photovoltaic power plant required to be simulated by the HiL real-time simulator, thereby reducing the simulation load of the HiL real-time simulator.

Based on the HiL testing platform for a photovoltaic power plant according to the above embodiments, a PPC performance testing method is provided according to an embodiment of the present disclosure. Referring to FIG. 2, the method includes the following steps S100, S102, and S104.

In step S100, a to-be-tested target performance of the PPC is determined.

In practical applications, the to-be-tested target performance of the IPPC may be determined according to the specific application environments and the user's requirements. The target performance may be any one of an active/reactive power scheduling performance, a high/low voltage ride through performance, and a frequency response performance.

It is apparent that the to-be-tested target performance is not limited to the above performances and may be other performances of the PPC to be tested. The target performance is not limited in the present disclosure, which is within the protection scope of the present disclosure.

In step S102, the HiL testing platform for a photovoltaic power plant is controlled to operate in a testing mode corresponding to the to-be-tested target performance.

In practical applications, the step S102 of controlling the HiL testing platform for a photovoltaic power plant to operate in a testing mode corresponding to the to-be-tested target performance may include the following steps S200 and S202 as shown in FIG. 3.

In step S200, corresponding to the to-be-tested target performance, a testing condition for the PPC, a testing condition for the inverter controller, a testing condition for the HiL real-time simulator, and a process sequence are determined.

For testing different target performances, the testing conditions for the PPC, the testing conditions for the inverter controller, the testing condition for the HiL real-time simulator, and the process sequences are respectively different.

In step S202, according to the process sequence, the PPC is controlled to operate in the testing condition for the PPC through the upper computer of the PPC, the inverter controller is controlled to operate in the testing condition for the inverter controller through the upper computer of the inverter controller, and the HiL real-time simulator is controlled to operate in the testing condition for the HiL real-time simulator through the upper computer of the HiL real-time simulator.

In practical applications, after the testing condition for the PPC, the testing condition for the inverter controller, the testing condition for the HiL real-time simulator, and the process sequence, corresponding to the to-be-tested target performance, are determined, the PPC may be controlled to operate in the testing condition for the PPC through the upper computer of the PPC, the inverter controller may be controlled to operate in the testing condition for the inverter controller through the upper computer of the inverter controller, and the HiL real-time simulator may be controlled to operate in the testing condition for the HiL real-time simulator through the upper computer of the HiL real-time simulator according to the process sequence.

Based on the above description, in a case that the to-be-tested target performance of the PPC is the active/reactive power scheduling performance, the HiL testing platform for a photovoltaic power plant may be controlled to operate in a testing mode corresponding to the to-be-tested target performance by performing the following operations.

Firstly, the inverter controller is controlled to operate in an active command and reactive command mode through the upper computer of the inverter controller, then a real-time simulation model is operated by the upper computer of the ILL real-time simulator. After the inverter controller detects that a grid-connection requirement is met, the inverter performs grid connection. After the photovoltaic power plant operates stably, the upper computer of the photovoltaic power plant configures an active power scheduling instruction and a reactive power scheduling instruction, and the upper computer of the HiL real-time simulator observes the changes of the active power and the reactive power at the point of connection. In the above process, the upper computer of the PPC records the active power scheduling instruction and the reactive power scheduling instruction of the PPC in the power scheduling process, and the upper computer of the HiL real-time simulator measures and records the voltage data and the current data at the point of connection.

In a case that the to-be-tested target performance of the PPC is the high/low voltage ride through performance, the HiL testing platform for a photovoltaic power plant may be controlled to operate in a testing mode corresponding to the to-be-tested target performance by performing the following operations.

Firstly, the upper computer of the inverter controller turns on a high/low voltage ride through function of the inverter controller, then a real-time simulation model is operated by the upper computer of the HiL real-time simulator. After the inverter controller detects that a grid-connection requirement is met, the inverter performs grid connection. After the photovoltaic power plant operates stably, the upper computer of the HiL real-time simulator performs high/low voltage ride through at a predetermined high/low ride through fault injection point. The upper computer of the PPC records flag bits corresponding to states of the PPC in the voltage ride through process, and the upper computer of the HiL real-time simulator measures and records the voltage data and the current data at the point of connection.

Figure 4:
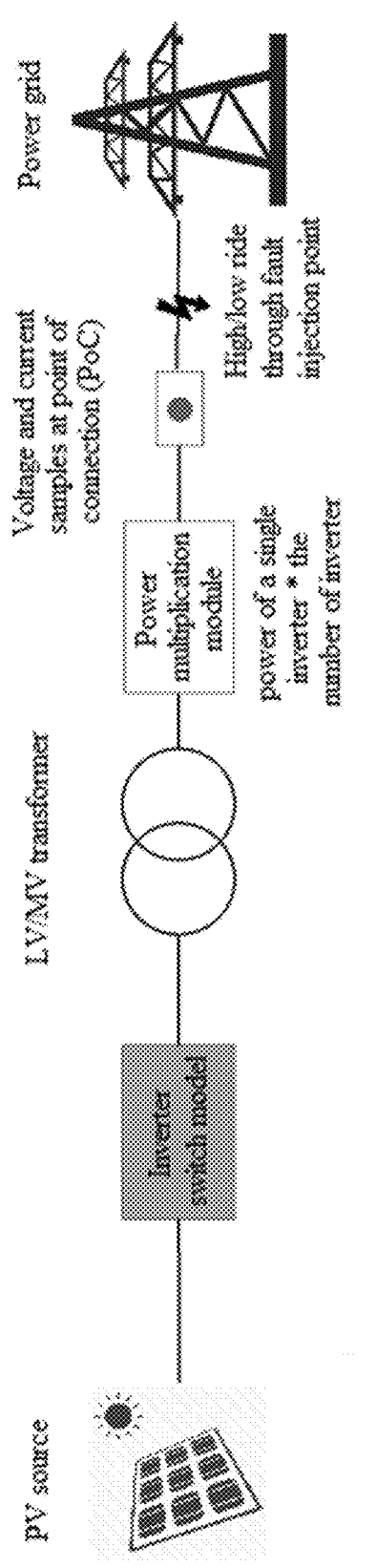
FIG. 4 shows a schematic diagram of presetting a high/low fault injection point according to an embodiment of the present disclosure.

It should be noted that as shown in FIG. 4, the predetermined high/low ride through fault injection point may be set between the point of connection and the power grid.

In a case that the to-be-tested target performance of the PPC is the frequency response performance, the HiL testing platform for a photovoltaic power plant may be controlled to operate in a testing mode corresponding to the to-be-tested target performance by performing the following operations.

Firstly, the upper computer of the inverter controller turns off a frequency response function of the inverter controller, turns on a frequency crossover function, and controls the operation mode to be an active power instruction scheduling and reactive power instruction scheduling mode. Then, the upper computer of the PPC turns on a frequency crossover function and a frequency response function of the photovoltaic power plant. Then, the upper computer of the HiL real-time simulator operates a real-time simulation model. After the inverter controller detects that a grid-connection requirement is met, the inverter performs grid connection. After the photovoltaic power plant operates stably, the upper computer of the HiL real-time simulator injects a predetermined frequency disturbance to the power grid.

Figure 5:
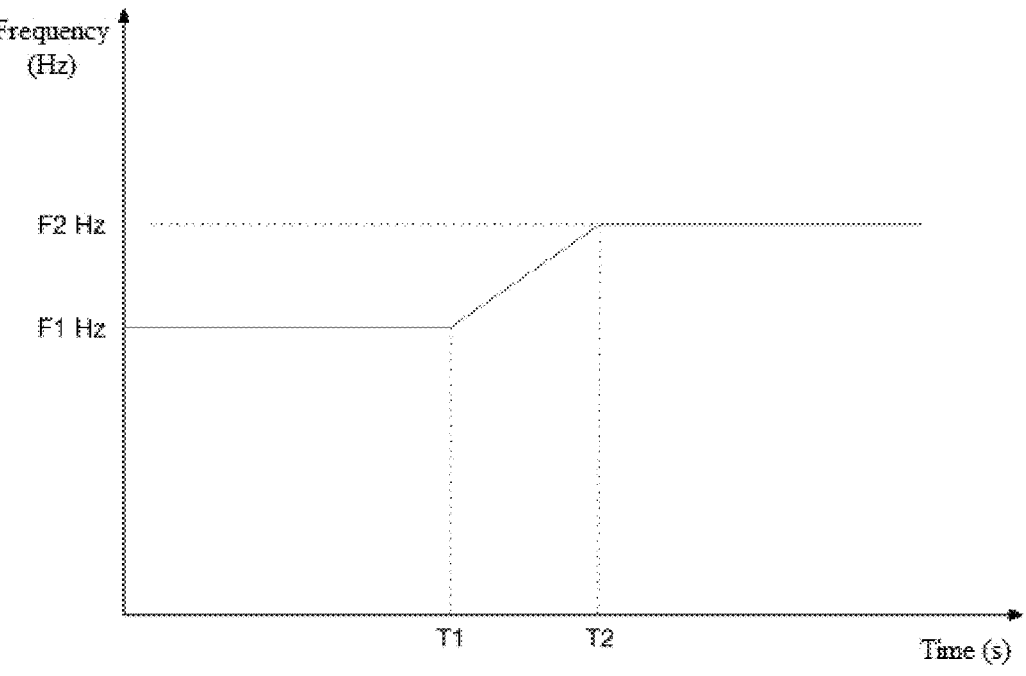
FIG. 5 shows a frequency disturbance curve with an increasing slope according to an embodiment of the present disclosure.
Figure 6:
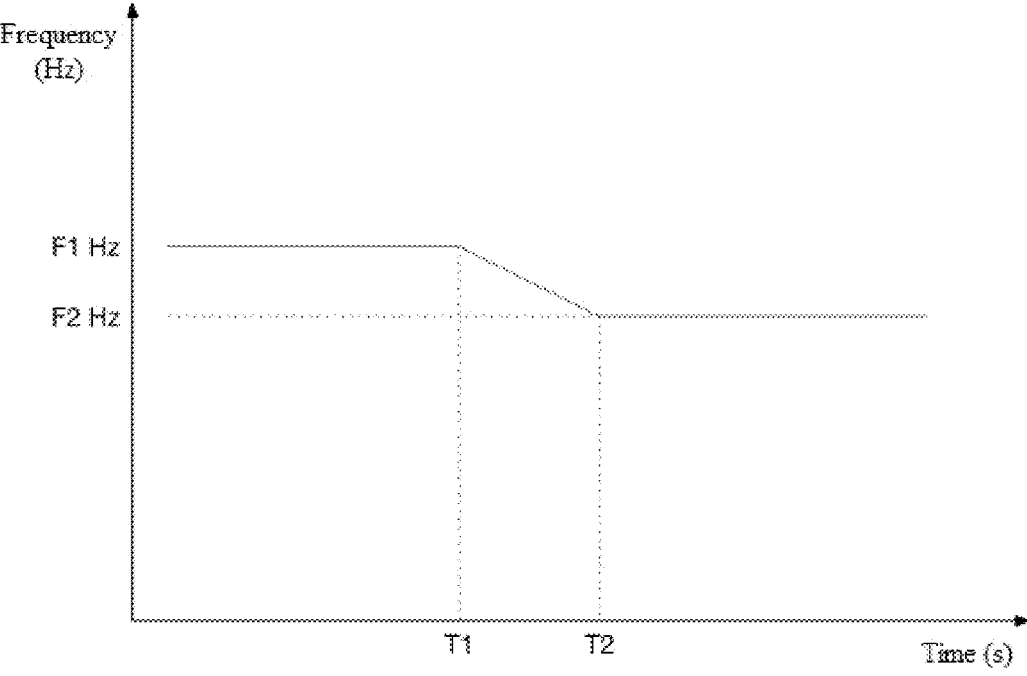
FIG. 6 shows a frequency disturbance curve with a decreasing slope according to an embodiment of the present disclosure.
Figure 7:
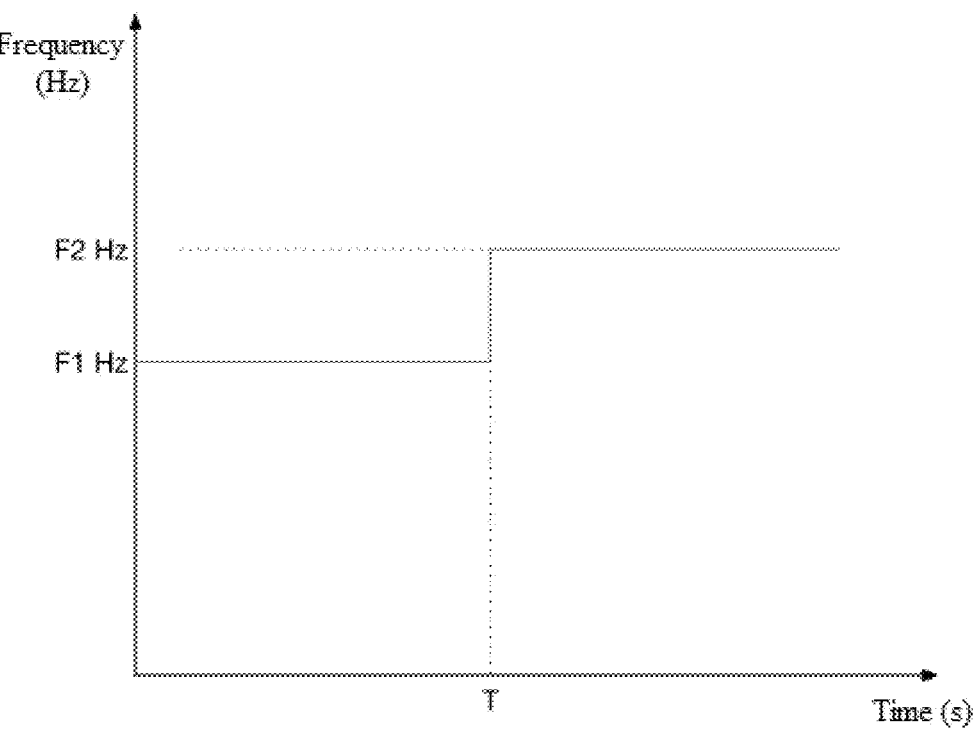
FIG. 7 shows a frequency curve with a sudden increase in slope step according to an embodiment of the present disclosure.
Figure 8:
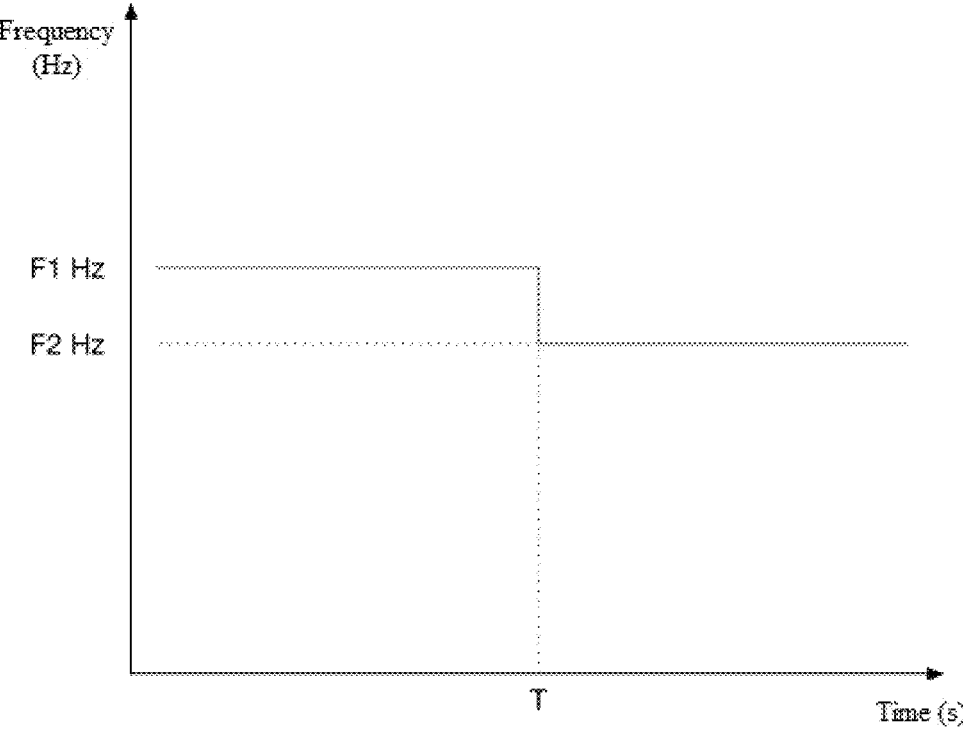
FIG. 8 shows a frequency curve with a sudden decrease in slope step according to an embodiment of the present disclosure.

It should be noted that the HiL testing platform for a photovoltaic power plant may realize various frequency disturbance powers. Specifically, the frequency disturbance may be an increase in slope as shown in FIG. 5 or a decrease in slope as shown in FIG. 6. In practical applications, different system inertia features may be simulated with different frequency change rates, so that an extreme operation condition may be simulated by a sudden increase in slope step or a sudden decrease in slope step, as shown in FIG. 7 or FIG. 8. FIG. 7 shows a sudden increase in slope step, and FIG. 8 shows a sudden decrease in slope step.

In step S104, testing data is obtained from the Hit, testing platform for a photovoltaic power plant, and the testing data is analyzed to obtain a performance testing result of the PPC.

In practical applications, the testing data in the testing process may be obtained from the upper computer of the PPC, the upper computer of the HiL real-time simulator, the upper computer of the inverter controller in the HiL testing platform for a photovoltaic power plant.

In the case that the target performance is the active/reactive power scheduling performance, the testing data may include: active power scheduling instructions and reactive power scheduling instructions issued by the PPC, and the voltage data and the current data at the point of connection. In the case that the target performance is the high/low voltage ride through performance, the testing data may include: a VRT flag of the PPC when a high/low voltage ride through fault occurs, the voltage data and the current data at the point of connection, and response data of the inverter. In the case that the target performance is the frequency response performance, the testing data may include: a flag indicating that the PPC enters frequency response, frequency change data detected by the PPC, a response time instant when the PPC issues an active power scheduling instruction to the inverter based on a frequency response curve according to a power grid standard, and a time instant when the inverter responds to a power scheduling instruction from the PPC.

It should be noted that a test result of the active/reactive power scheduling performance may be obtained by determining whether an output power at the point of connection changes with an instruction issued by the PPC, whether measured active power and reactive power at the point of connection are consistent with the instruction issued by the PPC after the power is stable, and whether an active power response rate and a reactive power response rate meet a power grid standard.

A test result of the high/low voltage ride through performance may be obtained by determining: a VRT flag of the PPC when a high/low voltage ride through fault occurs, whether a control loop is frozen during the high/low voltage ride through fault and the inverter responds to the voltage ride through fault, a VRT flag when the high/low voltage ride through fault is cleared and a situation of restoring a P control loop and a Q control loop, whether the inverter responds to the voltage ride through fault within a time period meeting a power grid standard, whether an active/reactive power response speed of the inverter meets a power grid standard, and the like.

In addition, an active power at the point of connection may quickly changes responding to a power instruction issued by the PPC by determining frequency changes monitored by the PPC when a frequency disturbance occurs, configurations of a frequency response flag bit, whether an active power scheduling instruction can be quickly issued to the inverter based on a frequency response curve according to a power grid standard, and whether the inverter can quickly respond to the power dispatching of the PPC.

Based on the above descriptions, the PPC performance testing method according to the embodiment may be applied to the HiL testing platform for a photovoltaic station. According to the method, a to-be-tested target performance of the PPC is determined, then the HiL testing platform for a photovoltaic power plant is controlled to operate in a testing mode corresponding to the to-be-tested target performance, and then testing data is obtained from the HiL testing platform for a photovoltaic power plant, and the testing data is analyzed to obtain a performance testing result of the PPC. Since the flexibility of pure digital simulation and the accuracy of physical testing are considered with the HiL testing platform for a photovoltaic power plant, a testing result with high reliability can be obtained with the HiL testing platform for a photovoltaic power plant, and the testing result can reflect the operation features of an actual photovoltaic power plant system. In addition, the PPC performance testing method applied to the HiL testing platform for a photovoltaic station is easy to be operated, can be performed for various tests, has high testing efficiency and low cost.

The features described in the embodiments in the present specification may be replaced or combined with each other. The same and similar parts of the various embodiments in this specification can be referred to each other, and each embodiment focuses on the differences from other embodiments. Especially, since the system or the system embodiments are similar to the method embodiments, the description of the system embodiments is simple, and related parts can refer to t the description of the method embodiments. The system and system embodiments described above are merely illustrative, and the units described as separate components may or may not be physically separated, and the components shown as units may or may not be physical units, that is, the components may be located in one place, or may be distributed to multiple network elements. Part or all of the modules can be selected according to practical requirements to achieve the purpose of the solution according to the embodiments. It can be understood and implemented by those skilled in the art without creative efforts.

It can be further understood by those skilled in the art that, the units and algorithm steps of the examples described in conjunction with the embodiments disclosed herein can be implemented by electronic hardware, computer software or a combination thereof. In order to clearly illustrate the possible interchangeability of the hardware and software, the composition and steps of each example have been generally described according to their functions in the above descriptions. Whether the functions are performed by hardware or software depends on the specific applications and design constraints of the technical solution. Those skilled in the art may use different methods to implement the described functions for each specific application, but such implementation should not be regarded as beyond the scope of the present disclosure.

According to the above descriptions of the disclosed embodiments, those skilled in the art can implement or use the present disclosure. Various modifications to these embodiments are apparent to those skilled in the art, and the general principles defined herein may be applied to other embodiments without departing from the spirit or scope of the present disclosure. Therefore, the present disclosure should not be limited to the embodiments disclosed herein, rather has the widest scope in accordance with the principle and the novel features disclosed herein.

It should be further noted that a relational term, such as first and second, in the present disclosure is only used to distinguish one entity or operation from another entity or operation and does not necessarily require or imply any actual relationship or order between these entities or operations. Furthermore, the terms "comprising/comprise(s)", "including/include(s)", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without further limitation, an element limited by the phrase "comprise(s)/comprising/include(s)/including/a(n) . . . " does not exclude the existence of other identical elements in the process, method, article or device including that element.

The invention claimed is:

1. A hardware-in-the-loop (HiL) testing platform for a photovoltaic power plant, comprising: a power plant controller (PPC), an inverter controller, and a HiL real-time simulator, wherein each of the PPC, the inverter controller, and the HiL real-time simulator is arranged with an upper computer;

the PPC is configured to communicate with the inverter controller according to a predetermined communication protocol;

the HiL real-time simulator is connected to the PPC and the inverter controller through a digital input interface and an analog output interface, and is configured to simulate a testing device in the photovoltaic power plant in a digital model form;

the upper computer of the HiL real-time simulator is configured to perform system modelling, perform real-time environment parameter configuration, manage instruments, and perform monitoring, transmit the real-time environment parameter configuration to the HiL real-time simulator via a communication port, and operation states of models in the HiL real-time simulator are uploaded to the upper computer of the HiL real-time simulator in real time via the communication port;

the upper computer of the inverter controller is configured to configure control parameters, protection parameters, and operation modes and other parameters for an inverter and monitor an operation state of the inverter; and the upper computer of the PPC is configured to configure operation parameters, control modes, power scheduling instructions to be transmitted by the PPC, and monitor data sampled by the PPC from the HiL real-time simulator in operating.

2. The HiL testing platform for a photovoltaic power plant according to claim 1, wherein the testing device simulated by the HiL real-time simulator in the digital model form comprises: a photovoltaic (PV) source, the inverter, a transformer, a transmission line, and a power grid.

3. The HiL testing platform for a photovoltaic power plant according to claim 2, wherein the number of the inverter controller is M; and the HiL real-time simulator further comprises: a power multiplier module configured to amplify a power of the inverter by N/M times, M represents a positive integer, and N represents the number of the inverter of the photovoltaic power plant.

4. The HiL testing platform for a photovoltaic power plant according to claim 1, wherein the HiL real-time simulator, the PPC and the inverter controller are synchronized.

5. The HiL testing platform for a photovoltaic power plant according to claim 1, wherein the predetermined communication protocol comprises any one of an IEC104 protocol, a GOOSE protocol, and a Modbus/TCP protocol.

6. The HiL testing platform for a photovoltaic power plant according to claim 1, wherein the inverter controller comprises: an inverter core control module and a communication module, and the inverter core control module is communicatively connected to the communication module through a controller area network (CAN) bus.

7. The HiL testing platform for a photovoltaic power plant according to claim 6, wherein the HiL real-time simulator is connected to the inverter core control module through the digital input interface and the analog output interface.

8. The HiL testing platform for a photovoltaic power plant according to claim 1, wherein the PPC comprises: a smart meter, a power plant controller, and a network switch, and the network switch is communicatively connected to the smart meter and the power plant controller.

9. The HiL testing platform for a photovoltaic power plant according to claim 8, wherein the HiL real-time simulator is connected to the smart meter through the analog output interface.

10. A power plant controller (PPC) performance testing method, wherein the method is applied to the HiL testing platform for a photovoltaic power plant according to claim 1, and the method comprises:

determining a to-be-tested target performance of the PPC;

controlling the HiL testing platform for a photovoltaic power plant to operate in a testing mode corresponding to the to-be-tested target performance;

obtaining testing data from the HiL testing platform for a photovoltaic power plant, and analyzing the testing data to obtain a performance testing result of the PPC; and managing an actual operating PPC based on the performance testing result.

11. The PPC performance testing method according to claim 10, wherein the controlling the HiL testing platform for a photovoltaic power plant to operate in a testing mode corresponding to the target performance to be tested comprises:

determining, corresponding to the to-be-tested target performance, a testing condition for the PPC, a testing condition for the inverter controller, a testing condition for the HiL real-time simulator, and a process sequence; and controlling, according to the process sequence, the PPC to operate in the testing condition for the PPC through the upper computer of the PPC, the inverter controller to operate in the testing condition for the inverter controller through the upper computer of the inverter controller, and the HiL real-time simulator to operate in the testing condition for the HiL real-time simulator through the upper computer of the HiL real-time simulator.

12. The PPC performance testing method according to claim 10, wherein the target performance comprises any one of an active/reactive power scheduling performance, a high/low voltage ride through performance and a frequency response performance.

* * * * *